May 19, 1970  H. L. FRIEND  3,513,389
METER TEST RACK HAVING PNEUMATICALLY CONTROLLED CONNECTORS
Filed Oct. 24, 1965  2 Sheets-Sheet 1
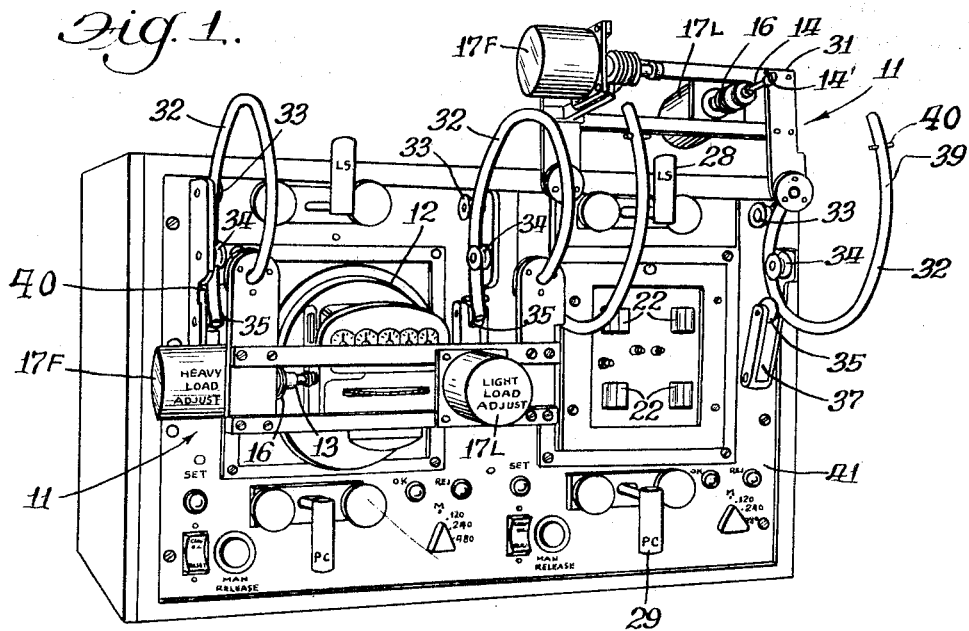
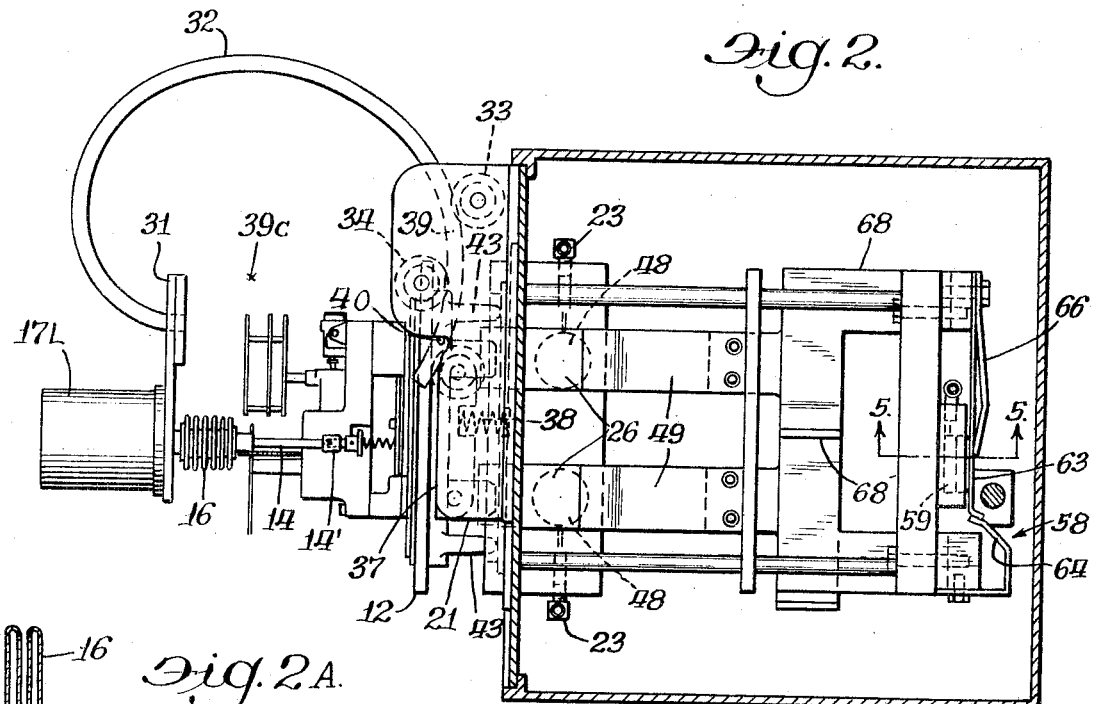
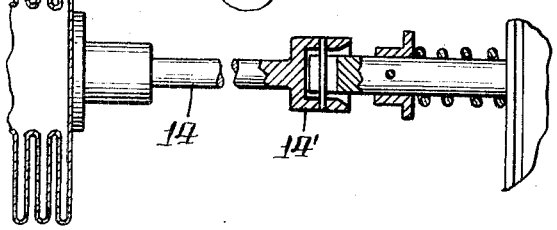
Inventor
Harley L. Friend
By
Darbo, Robertson & Vandenburgh
Attys.

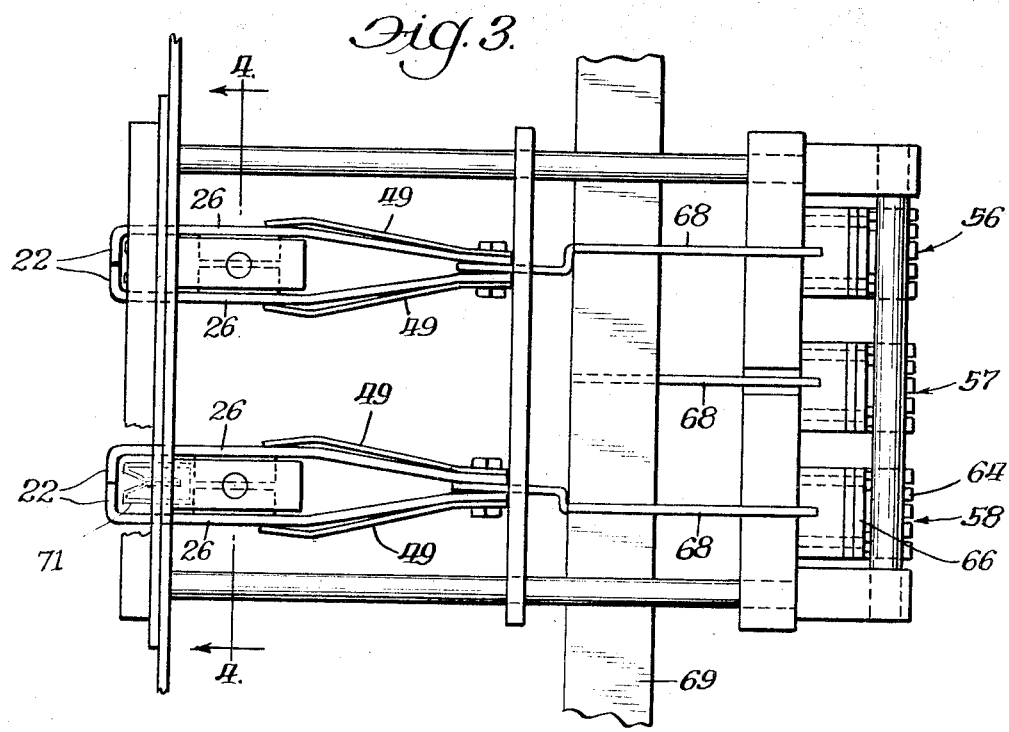
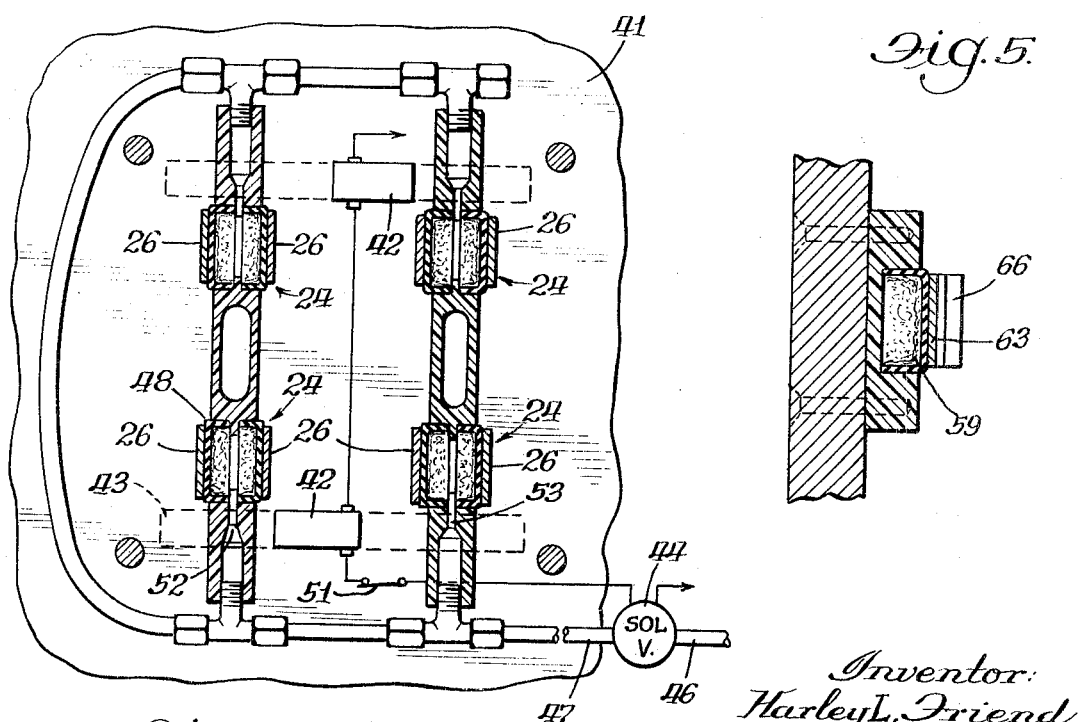

United States Patent Office 3,513,389
Patented May 19, 1970

3,513,389
METER TEST RACK HAVING PNEUMATICALLY CONTROLLED CONNECTORS
Harley L. Friend, Lafayette, Ind., assignor to Duncan Electric Company, Inc., a corporation of Indiana
Filed Oct. 24, 1965, Ser. No. 505,072
Int. Cl. G01r 35/00
U.S. Cl. 324—74        13 Claims

ABSTRACT OF THE DISCLOSURE

A test rack for watt-hour meters is disclosed. The test rack includes heavy amperage contact members biased toward each other, in some instances for retaining the terminal blades of a watt-hour meter with floating accommodation to their position. A compressed air actuator of cylinder and plunger type, lubricated, effects spreading of the contact members, permitting insertion or removal of the watt-hour meter. Switch means are also included for automatically terminating the supply of compressed air to the actuator in response to the accurate positioning of the meter on the test rack. Motors to be coupled to meter adjustment screws through flexible bellows for automatic calibration of the meter are mounted on a rack swing-mounted by rods of off-arcuate shape.

---

The invention of which this disclosure is offered for public dissemination in the event that adequate patent protection can be given relates to test racks for electricity (watt-hour) meters and to the automatic calibration of such meters.

Electricity or watt-hour meters must be calibrated individually. A great deal of work has been done in the past toward improving the calibration of such meters. It has long been the practice to have a multimeter test rack on which a bank of meters would be "plugged in" and given a variety of test runs for comparison with a standard meter. The errors of the meters under test would be noted in one way or another and adjustments made in accordance with the results of test run. Some aspects of the present invention would be suitable for use generally according to prior test or calibration practices. Other aspects, however, are especially suitable for use in conjunction with automatic calibration apparatus.

One of the features of the invention of wide possible use is a fluid actuated electrical connector which in one form merely operates a switch and in another form operates clamping connectors which clamp upon the meter terminal blades.

Another feature of the invention is an improved coupler for quickly and easily coupling a calibrating motor to each of the adjustment devices normally operated during calibration. Another aspect of the invention is an improved swinging mounting for moving the calibration motors into their proper position for being coupled after a meter is mounted in place. This swinging mounting means uses a specially curved guide bar running between tensioned rollers so that the swinging action is not only guided with special attributes but it is also variably counterbalanced. Additional objects and advantages of the invention will be apparent from the following description and from the drawings.

DESIGNATION OF FIGURES

FIG. 1 is a perspective view of a two-position test rack assembly, a meter being mounted in one position with the calibration motor swung into operative position, and the other position being empty and its calibration motors being swung out a little way for inserting a meter into place.

FIG. 2 is a vertical sectional view through the case of FIG. 1 showing a side elevation of the equipment carried by the case.

FIG. 2A is an enlarged partly sectional view of one of the calibration driving rods.

FIG. 3 is a top view of the equipment within the case for one meter position, some of the parts being omitted for clarity.

FIG. 4 is a fragmentary vertical sectional view taken approximately on the line 4—4 of FIG. 3.

FIG. 5 is a fragmentary sectional view taken approximately on the line 5—5 of FIG. 2, to the actuator for the switch.

Although the foregoing disclosure offered for public dissemination is detailed to ensure adequacy and so aid understanding, this is not intended to prejudice that purpose of a patent which is to cover each new inventive concept therein, no matter how others may later disguise it by variations in form or additions or further improvements. The following claims are intended as the chief aim toward this purpose, as it is these that meet the requirement of pointing out the parts, improvements, or combinations in which the inventive concepts are found.

GENERAL DESCRIPTION OF CALIBRATING OPERATION

A complete test rack will include about 8 or so of the two-position units shown in FIG. 1. Making them as two-position units has been found to be convenient. A suitable framework will hold the entire group of two-position units in one line.

Initially we may assume that all of the swing units 11 are up as shown at the right in FIG. 1. The attendant will at each position insert a meter 12 as seen at the left in FIG. 1 and swing the swing frame 11 down to the position shown at the left in FIG. 1. The attendant will then apply full load adjustment rod 13 to the full load screw or adjustment device of the meter and light load adjustment rod 14 to the light load adjustment screw or device of the meter. These rods are carried by flexible bellows 16 which permit the rods to be moved easily in any direction but exerts mild resilient pressure in the direction toward the screw being adjusted. When required, as to be described, a stepping motor 17L will turn rod 14 through its bellows 16 and full load stepping motor 17F will turn rod 13 through its bellows 16.

As each meter 12 is inserted into place, its terminal blades 21 at the rear thereof will be clamped and connected by terminal clamps 22. Although in the past spring clamps have been used in this location, the clamps in this instance are preferably fluid actuated, and automatically controlled. Fluid, preferably compressed air, can be supplied through line 23, FIG. 2 to actuate pneumatic spreaders 24 in FIG. 4 to spread apart the bars 26 of terminal clamps 22, when a meter is being inserted or removed. Removal of the fluid pressure allows spring action to close the clamps on the terminal blades.

By means to which the present application is not directed, and which could be as known in the prior art, currents and voltages are applied to the respective coils of the meter for successive test runs. At the completion of the first set of tests, a determination is made as to how much each of the meter adjusting screws should be turned. Then, the calibrating motor 17L and 17F are respectively given the proper number of pulses, with proper directional control for making the determined adjustments in the adjustment screws. A new set of test runs will then be made, and the adjusting process can be repeated if necessary. When all of the meters have either been rejected or brought to their required degree of preciseness, the various swing racks 11 will be raised and the meters removed, to be packed and shipped except for any rejects.

Preciseness of testing is achieved by photoelectric means for determining exact revolutions of the discs of the meters being tested. These photoelectric means may comprise a lamp 28 and a photocell 29 which project and receive a beam through anticreep holes in the meter disc.

SWING FRAMES

The calibration motors 17L and 17F are mounted on a rigid platelike grid 31 which in turn is carried by a pair of curved guide rods 32 rigidly connected to grid 31. Each curved guide rod 32 passes through a set of grooved rollers 33, 34 and 35. Rollers 33 and 34 have fixed axes, but the roller 35 is carried by a pivoted link 37 biased by sturdy spring 38 to press the guide rod 32 firmly into engagement with both of rollers 33 and 34. Each of the grooved rollers, 33, 34 and 35, is preferably provided with a rolling type of bearing for maximum ease of operation of the rack 11. Likewise the groove is of generally V-shape engaging the rods 32 by surfaces which are flat in cross section and lying at an angle opening outwardly at 120° from each other.

The guide rods 32 may be of ⅜ inch diameter stainless steel, seamless tubing. Through most of their length they are shaped as an Archimedes spiral, so that the pressure of spring urged roller 35 thereon tends to counterbalance the weight of the parts. However, approximately the portion of the rod 32 which is seen in FIG. 2 as being in the area of rollers 33, 34, 35 is shaped to ensure that frame 11 stays in place properly when in its down position shown in FIG. 2. To this end, this portion of the rod 32 may be of arcuate shape, relying on gravity to hold the frame 11 in position. Or this part of the rod 32 may have a slight reverse spiral to add a downward bias for swing frame 11 when in this position. Swing frame 11 is prevented from swinging downwardly below the position shown in FIG. 2 by a pin 39 through the rod 32.

If desired, the strength of spring 38 may be such as to more than counterbalance the weight of swing unit 11 so that when it is started upwardly it will continue upwardly to its fully retracted position shown at the right in FIG. 1. However, since the weight or downward torque of swing frame 11 reduces as it approaches its upward position, a strength of spring 38 which a little more than counterbalances gravity in that position is believed to be ideal. Of course, the rod or tube 32 may have a varying spiral, in addition to the arcuate terminal portion, if desired.

A very desirable feature of the guide rod mounting is the path followed by the mounting panel 31 in the course of being simply inverted 180 degrees. Because the arcuate portion 39 of guide rods 32 has its center at a point 39C which is approximately directly over the front of the meter 12, initial movement of the grid 31 is swinging about that center and hence almost directly away from the meter. The final movement of the grid 31 is almost directly rearwardly, because of the shifting center of the Archimedes spiral. This desirable movement, together with counterbalancing, is achieved in spite of the fact that all of the fixed mounting elements, the rollers 33, 34 and 35 corresponding to hinges, are ideally located close to the front panel 41 of the test rack, and without any projections rearwardly of this panel which might cause conflict with the electrical and air equipment in that region. Pins 40 limit the downward movement of grid 11 (FIG. 1, left).

PNEUMATIC TERMINAL CLAMPS

When a meter 12 to be tested is properly positioned on the rack, it will actuate two switches 42 on the back of panel 41, these being seen in FIG. 4. These two microswitches are actuated by pins extending through the panel 41 and pressed by two of the insulating legs 43 with which meters are conventionally provided. Two diagonally located legs are chosen for this so that the switches 42 will not both be actuated unless the meter is pressed "home." Preferably spring strips 43 are positioned on the front of the panel to be directly engaged by the four posts 43 for uniformity of positioning and of actuation of the switches 42.

The two switches 42 are in series and are connected to a solenoid valve 44 which is open on de-energization. Thus, when the meter is pressed "home," the circuit through both switches 42 will be completed and will close off solenoid valve 44 as to pressure supply line 46 but open a vent for controlled line 47. This will release air from the four actuators 24, allowing their eight plunger cups 48 to recede under the influence of terminal clamp bars 26 which are reinforced by leaf springs 49 so that they clamp very firmly on the terminal blades 21. This not only holds the meter safely in place, but produces a connection of extremely low contact resistance. When the tests are complete, a switch 51 will be opened automatically or manually for de-energizing solenoid valve 44, allowing air from pressure supply pipe 46 to flow into actuators 24, thereby urging plunger cups 48 outwardly and spreading apart the bars 26 to release the terminal clamps and allow the meters to be withdrawn. It is probably best for this switch to be actuated by a button at the front of the panel so that the attendant can place a hand on the meter as he presses the button for its release.

The plunger cups 48 may desirably be neoprene rubber cups, readily available as hydraulic actuator cups. The cylinder in which they operate, open at both ends, is bored in a bar 52 of suitable plastic, such as "Plexiglas." The cylinders between the cups are largely filled with silicone grease, in a sufficient quantity so that some is applied to the cylinder wall. It has been found that this grease not only ensures an airtight seal, but guards against wear on the cups or sticking of the cups to the cylinder. The ports 53 leading to the cylinders may be drilled longitudinally in the bars 52 as seen in FIG. 4, and counterbored and threaded to fit the air supply fittings.

As is apparent from the drawings, especially FIG. 3, the firmness by which the terminal clamps are gripped by jaws 22 is accomplished without danger of a severe unbalanced thrust on one side of the terminal blade, such as might bend the terminal blade, or raise a question of whether it might have caused inaccurate calibration by shifting something within the meter. This results from the fact that each clamp assembly is supported by an elongate bus bar 68, and each pair of clamps 22 is so located as to have great leverage in any necessary flexing of the bus bar 68 to accommodate minute variations in the positioning of the terminal blades such as may be permissible within normal manufacturing tolerances. From FIG. 4 it is apparent that the pneumatic spreaders or actuators 24 are of a free-floating nature which offers substantially no opposition to the accommodation of the clamps to the terminal blades even while air is moving into or out of these spreaders. If one of a pair of clamps 22 engages the terminal blade before the other, in closing upon the terminal blade, the force of its unbalanced side thrust on the terminal blade prior to firm closing by the other clamp of the pair will not be determined by the strength of its bar 26 reinforced by spring 49, but by the ease of flexing of supporting bus bar 68, the cups 48 being free to move unequally so as not to add to the force resisting such flexing.

PNEUMATIC SWITCHES

Each meter position is provided with three switches 56, 57 and 58. They may all be operated pneumatically as shown in FIG. 5 in a manner similar to that described. In this instance, the cylinders 59 are open only at one end, one plunger cup 61 being enough. Also, a spacer 62 of the same diameter of the cup, but moving freely after it into the cylinder 59, is provided, as a longer movement of the plunger is desired than with respect to the terminal clamps.

The plunger cup 61, through spacer 62, actuates a spring contact 63, which resiliently presses against fixed contact 64, being pressed more firmly against it by reinforcing spring 66. Preferably the contacts 63 and 64 have tip portions bent nearly perpendicular to the line of movement of spring contact 63 so that a wiping effect will be provided as well as firm contact. As seen in FIG. 3, fixed contact 64 is preferably slotted to provide independent resiliency of several fingers for ensuring extremely low contact resistance. It should be understood that these switches, and also the bars 26 of the terminal clamps carry heavy amperage. Hence, they are quite heavy cross sectioned and formed of copper, hard-drawn copper being preferred. The springs which reinforce them may desirably be Phosphor bronze. The various conducting bars are preferably silverplated at least on their contact areas.

Switches 56 and 58 are by-pass switches which provide a by-pass connection for the meter position when the meter is in place thereon. These may be controlled by switches 42, but with opposite control from that of the terminal clamps. In other words, in this instance when a meter is pressed "home" the switches 42 cause air to be supplied to cylinders 59 of switches 56 and 58 thereby opening these switches so that the by-pass will be broken, and current will flow through the meter current coils instead. Thus, each of the terminal clamps 22 is connected by a heavy bus bar 68 to one of the contact members 56 and 58. The same bus bar may be extended at a different angle to provide an external connection 69 for its associated terminal blade.

Bars 26 are sharply bent near their tips and spaced far enough apart immediately to the rear thereof to make room for separate spring potential clamps 71. This makes potential test connections through terminal blades of meter independently of the bars 26 which carry heavy current load.

I claim:

1. A test rack for meters including terminal clamps having elongated arms biased firmly into position for firmly engaging the terminals of a meter, bi-pass switches connected between appropriate pairs of said terminal clamps and biased firmly to the closed position, compressed air actuators for spreading apart the bars of a terminal clamp and for opening the by-pass switches when the respective actuators are supplied with compressed air, and switches actuated by two well spaced apart points of the meter near a median line thereof when the meter is fully in a predetermined position, said switches being connected in series with each other and with control means for controlling the supply of compressed air to said actuators, said control means being responsive to a closing of both switches by the meter for releasing air from the terminal clamp actuators and supplying air to the by-pass switch actuators, and manual control means for opening the circuit through said switches to close the by-pass switches and open the terminal clamps when it is desired to remove a meter.

2. A test rack for meters including terminal clamps having elongated arms biased firmly into position for firmly engaging the terminals of a meter, compressed air actuators for spreading apart the bars of each said terminal clamp when the actuators are applied with compressed air, and switches actuated by two well spaced apart points of the meter near a median line thereof when the meter is fully in a predetermined position, said switches being connected in series with each other and with control means for controlling the supply of compressed air to said actuators, said control means being responsive to a closing of both switches by the meter for releasing air from the terminal clamp actuators, and manual control means for opening the circuit through said switches to close the by-pass switches and open the terminal clamps when it is desired to remove a meter.

3. A test rack for meters including terminal clamps having elongated arms biased firmly into position for firmly engaging the terminals of a meter, compressed air actuators for spreading apart the bars of each said terminal clamp when the actuators are supplied with compressed air, and switches actuated by two well spaced apart points of the meter near a median line thereof when the motor is fully in a predetermined position, said switches being connected in series with each other and with control means for controlling the supply of compressed air to said actuators, said control means being responsive to a closing of both switches by the meter for releasing air from the terminal clamp actuators.

4. A test rack for meters including terminal clamps having elongated arms biased firmly into position for firmly engaging the terminals of a meter, compressed air actuators for spreading apart the bars of each said terminal clamp when the actuators are supplied with compressed air, and switches actuated by two well spaced apart points of the meter near a median line thereof when the meter is fully in a predetermined position, said switches being connected in series with each other and with control means for controlling the supply of compressed air to said actuators, said control means being responsive to a closing of both switches by the meter for releasing air from the terminal clamp actuators;
   said actuators comprising a cylinder, cup-plunger means therein of grease resistant rubber, and grease substantially filling said cylinders when the cup means are retracted.

5. A test rack for meters including terminal clamps having elongated arms biased firmly into position for firmly engaging the terminals of a meter, compressed air actuators for spreading apart the bars of each said terminal clamp when the actuators are supplied with compressed air, and switches actuated by two well spaced apart points of the meter near a median line thereof when the meter is fully in a predetermined position, said switches being connected in series with each other and with control means for controlling the supply of compressed air to said actuators, said control means being responsive to a closing of both switches by the meter for releasing air from the terminal clamp actuators;
   said actuators comprising a cylinder, cup-plunger means therein of grease resistant rubber, and grease on the interface between the rubber and cylinder, and disposed to move the bar against its bias when compressed air is supplied to the cylinder, and grease applied to the interface of the cylinder and rubber.

6. A test rack for meters including terminal clamps having contact members biased firmly into position for firmly engaging the terminals of a meter, compressed air actuators for spreading apart the contact members of each said terminal clamp when the actuators are supplied with compressed air, and switches actuated by two well spaced apart points of the meter near a median line thereof when the meter is fully in a predetermined position, said switches being connected in series with each other and with control means for controlling the supply of compressed air to said actuators, said control means being responsive to a closing of both switches by the meter for releasing air from the terminal clamp actuators.

7. A test rack for meters including terminal clamps having contact members biased firmly into position for firmly engaging the terminals of a meter, compressed air actuators for spreading apart the contact members of each said terminal clamps when the actuators are supplied with compressed air, and switch means actuated when the meter is accurately in a predetermined position on said rack, said switch means being connected in series with control means for controlling the supply of compressed air to said actuators, said control means being responsive to a closing of said switch means by the meter for releasing air from the terminal clamp actuators.

8. A test rack for meters including terminal clamps having contact members biased firmly into position for firmly engaging the terminals of a meter, by-pass switches, each having a contact member biased firmly toward another contact member, compressed air actuators for spreading apart the contact members of each said terminal clamps and switches when the actuators are supplied with compressed air, and switch means actuated when the meter is accurately in a predetermined position on said rack, said switch means being connected in series with control means for controlling the supply of compressed air to said actuators, said control means being responsive to a closing of said switch means by the meter for releasing air from the terminal clamp actuators and supplying air to the actuators for the by-pass switches.

9. A test rack for watt-hour meters having current coils, said test rack including terminal clamps having heavy amperage contact members at least one of which is biased firmly into position to make a firm contact of low resistance at heavy amperage, a compressed air actuator for spreading apart the contact members when the actuators are supplied with compressed air, and switch means actuated when the meter is accurately in a predetermined position on said rack, said switch means being connected in series with control means for controlling the supply of compressed air to said actuator.

10. A test rack for making contact with meter terminal blades and firmly gripping them to hold a watt-hour meter in place, including sturdy contact bars biased firmly toward each other, fluid actuated expansion means between the bars, means for supplying fluid under pressure to the expansion means to spread apart the contact bars to permit entry and removal of the terminal blades, and means to discontinue the supply and dissipate the supplied fluid automatically when a meter is accurately in position on the rack.

11. A test rack for watt-hour meters having current coils, said test rack including terminal clamps having heavy amperage contact members for carrying current coil amperage, at least one of which contact members is biased firmly toward the other to make a firm contact of low resistance at heavy amperage, a compressed air actuator comprising a shallow cylinder, a plunger-cup of grease resistant rubber in said cylinder and disposed to move the contact member against its bias when compressed air is supplied to the cylinder, and grease applied to the interface of the cylinder and rubber.

12. A test rack for watt-hour meters having current coils, said test rack including heavy amperage contact members for carrying current coil amperage, at least one of which contact members is biased firmly toward the other to make a firm contact of low resistance at heavy amperage, a compressed air actuator comprising a shallow cylinder, a plunger-cup of grease resistant rubber in said cylinder and disposed to move the contact member against its bias when compressed air is supplied to the cylinder, and grease applied to the interface of the cylinder and rubber.

13. A test rack for watt-hour meters having current coils and terminal blades connected to them, said test rack including terminal clamps, each clamp having a pair of heavy amperage contact members for carrying current coil amperage, the contact members being biased firmly toward each other to make a firm contact of low resistance at heavy amperage but mounted with a degree of joint yieldability to accommodate small variations of terminal blade positioning; a compressed air spreader between the contact members, of cylinder and plunger type, to spread the contact members apart against their bias when compressed air is supplied to the cylinder, said spreader having free-floating characteristics individual to the clamp to control the spreading substantially without resistance to the accommodation of the clamp to the terminal blade.

References Cited
UNITED STATES PATENTS

| 2,711,523 | 6/1955  | Willis.   |          |
|-----------|---------|-----------|----------|
| 2,825,037 | 2/1958  | French    | 339—17   |
| 2,978,666 | 4/1961  | McGregor  | 339—17   |
| 3,366,916 | 1/1968  | Oktay     | 339—74   |
| 2,066,299 | 12/1936 | Mylius    | 324—74 XR|
| 2,218,650 | 10/1940 | Larson    | 324—74 XR|

FOREIGN PATENTS 1,118,852   12/1961   Germany.

RUDOLPH V. ROLINEC, Primary Examiner

E. L. STOLARUN, Assistant Examiner

U.S. Cl. X.R.

339—117

UNITED STATES PATENT OFFICE
CERTIFICATE OF CORRECTION

Patent No. 3,513,389            Dated May 19, 1970

Inventor(s) Harley L. Friend

It is certified that error appears in the above-identified patent and that said Letters Patent are hereby corrected as shown below:

Column 5, line 64, "applied" should be -- supplied -- .
Column 6, line 7, "motor" should be -- meter -- .

SIGNED AND
SEALED
OCT 13 1970

(SEAL)
Attest:

Edward M. Fletcher, Jr.
Attesting Officer

WILLIAM E. SCHUYLER, JR.
Commissioner of Patents